Patented Mar. 13, 1951

2,544,891

UNITED STATES PATENT OFFICE 2,544,891

CELLULOSE ORGANIC ACID ESTER PLASTICS CONTAINING PARAMETHOXYPHENYL PARA-ANISATE

Lester W. A. Meyer and William M. Gearhart, Kingsport, Tenn., assignors to Eastman Kodak Company, Rochester, N. Y., a corporation of New Jersey No Drawing. Application December 20, 1946, Serial No. 717,600

3 Claims. (Cl. 106—179)

1

This invention relates to cellulose organic acid ester plastics, and more particularly to the stabilization of such plastics.

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultra-violet light: e. g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultra-violet light.

We have found that the addition of a small proportion of p-methoxyphenyl p-anisate

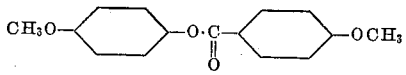

to a cellulose organic acid ester plastic composition strongly inhibits breakdown of the resulting plastic by exposure to ultra-violet light. We prefer to use approximately 1% or less of p-methoxyphenyl p-anisate, based on the weight of cellulose organic acid ester. Higher amounts give only slightly greater weathering resistance, and may change the physical properties of the plastic. We may use from 0.5% to slightly over 1% of the inhibitor. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure. p-Methoxyphenyl p-anisate is prepared by the method described in German patents 46,756 (1889) and 43,713 (1888), namely, by heating p-methoxyphenol and anisic acid with phosphorus trichloride.

In testing our cellulose organic acid ester plastics containing p-methoxyphenyl p-anisate, we have employed outdoor exposure in Arizona, Florida, and Tennessee, as well as an accelerated weathering test in the Kline sunlight-fog chamber. This test is described in section B-14 of the Federal Specification for Plastics, Organic; General Specifications (Methods of Tests) L-P-406a, method No. 6021, pages 57, 58 and 100, published by the U. S. Treasury Department, Federal Specifications Division. Two hundred hours under this test has been found to be roughly equivalent to one year of weathering in Washington, D. C. However, the climates of Florida and Arizona are much more severe as to ultra-violet light than the climate of Washington, D. C. In the Kline accelerated test, when samples 0.050″–0.075″ thick are used, the bleaching-brittleness stage of a plasticized cellulose organic acid ester plastic containing no ultra-violet inhibitor is reached in about 180–200 hours. Crazing occurs in 200–250 hours exposure, although occasionally 300 hours is reached without crazing, but with the development of brittleness. Similar samples of plasticized cellulose organic acid ester plastics of the same compositions, but containing in addition 1% (based on the weight of cellulose ester) of p-methoxyphenyl p-anisate, withstood 1040 hours in the Kline accelerated test before failing. Correspondingly favorable results are indicated by the progress of outdoor exposure tests.

p-Methoxyphenyl p-anisate is advantageously introduced into a cellulose organic acid ester plastic at the time the cellulose ester is compounded with the plasticizer. This compounding may be accomplished by any of the known methods, including the method of working on hot rolls described in Conklin's U. S. Patent 2,155,303. p-Methoxyphenyl p-anisate causes no substantial discoloration of the plastic, even when the hot-rolling method of compounding is employed, and no substantial discoloration takes place during either outdoor exposure or accelerated testing.

By way of application, we give the following example of making up cellulose organic acid ester plastics containing p-methoxyphenyl p-anisate. It will be understood that this illustration does not constitute a limitation of our invention, which is defined in the appended claims.

*Example.*—100 parts of cellulose acetate butyrate containing approximately 12% acetyl and 37% butyryl is intimately mixed in a Sigma blade mixer with 14 parts of dibutyl sebacate and 1 part of p-methoxyphenyl p-anisate. The mixture is worked on hot rolls by the method described in the Conklin Patent 2,155,303. The resulting plastic can then be granulated and be ready for any molding or extrusion operation. A sheet formed by compression molding of the granulated material will withstand 1040 hours in the accelerated sunlamp-fog chamber weathering test. A sheet produced in the same way from material having the same composition except that it contains no p-methoxyphenyl p-anisate will withstand only 200–250 hours in the same test.

Any of the known plasticizers for cellulose organic acid esters, such, for example, as dibutyl phthalate, dibutyl sebacate, methoxyethyl stearate, tricresyl phosphate, butoxyethyl phthalate, diamyl phthalate, ethyl p-toluene sulfonamide, etc. may be used. In the case of the softer cellulose esters, such as cellulose acetate-butyrate, plastics may even be formed without the use of any plasticizer.

What we claim as our invention and desire to be secured by Letters Patent of the United States is:

1. A cellulose organic acid ester plastic comprising a cellulose organic acid ester selected from the group consisting of cellulose acetate, cellulose propionate, cellulose butyrate, cellulose acetate-propionate and cellulose acetate-butyrate, a plasticizer therefor, and, as an agent for inhibiting deterioration of the plastic by ultra-violet light, approximately 0.5%–1%, based on the weight of the cellulose ester, of p-methoxyphenyl p-anisate.

2. A cellulose acetate-butyrate plastic comprising cellulose acetate-butyrate, a plasticizer therefor, and, as an agent for inhibiting deterioration of the plastic by ultra-violet light, approximately 0.5%–1%, based on the weight of the cellulose acetate-butyrate, of p-methoxyphenyl p-anisate.

3. A cellulose acetate-butyrate plastic comprising cellulose acetate-butyrate and, as an agent for inhibiting deterioration of the plastic by ultra-violet light, approximately 0.5%–1%, based on the weight of the cellulose acetate-butyrate, of p-methoxyphenyl p-anisate.

LESTER W. A. MEYER.
WILLIAM M. GEARHART.

REFERENCES CITED

The following references are of record in the file of this patent:

UNITED STATES PATENTS

| Number | Name | Date |
|---|---|---|
| 1,826,692 | Carroll | Oct. 6, 1931 |
| 1,912,734 | Stand et al. | June 6, 1933 |
| 2,333,577 | Koch | Nov. 2, 1943 |

OTHER REFERENCES

Chemical Abstracts of the Am. Chem. Soc., 3rd dec., part 1, page 3100.